United States Patent [19]
Peterson, Jr. et al.

[11] Patent Number: 4,842,077
[45] Date of Patent: Jun. 27, 1989

[54] DISK HARROW STANDARD FOR SUPPORT BEAMS OF DIFFERENT CROSS SECTIONS

[75] Inventors: Willard E. Peterson, Jr., Geneseo, Ill.; James F. Bierl, West Des Moines, Iowa

[73] Assignee: Deere & Company, Moline, Ill.

[21] Appl. No.: 208,693

[22] Filed: Jun. 20, 1988

[51] Int. Cl.$^4$ .................. A01B 15/16; A01B 23/06
[52] U.S. Cl. ...................................... 172/599; 172/763
[58] Field of Search ............... 172/599, 600, 579, 601, 172/763, 765; 384/460

[56] References Cited

U.S. PATENT DOCUMENTS

| | | | |
|---|---|---|---|
| 3,425,755 | 2/1969 | Harris | 172/763 |
| 3,576,216 | 4/1971 | Tanke | 172/601 |
| 3,833,067 | 9/1974 | Peterson, Jr. et al. | 172/566 |
| 4,249,782 | 2/1981 | Frank | 308/187 |
| 4,333,535 | 6/1982 | Hentrich, Sr. | 172/572 |
| 4,461,358 | 7/1984 | Lewison | 172/763 |

OTHER PUBLICATIONS

Bush Hog Field Cultivators 12000 Series Brochure, BH-8, Date Stamped Jan. 11, 1978.
Westgo Field Cultivator Brochure, Date Stamped Apr. 10, 1978.
Bush Hog Advertizing Brochure Field Cultivators 1200 Series BH-8, 1-1-78.
Westgo Field Cult Brochure 4-1978.

Primary Examiner—Richard J. Johnson

[57] ABSTRACT

A disk bearing standard which may be utilized with support tubes of different cross sections by simply changing a low cost U-bolt which clamps the standard to the tube. The standard includes front and lower locating surfaces formed at an angle of ninety degrees with respect to each other. A bolt-receiving member angles upwardly from the forward surface at an angle of about forty-five degrees and receives an angled leg of the U-bolt. The rear leg of the U-bolt extends downwardly through an elongated slot at the aft end of the lower locating surface. The size of the U-bolt is selected according to the size of the mounting tube, and the U-bolt clamps the standard in two planes perpendicular to each other to prevent misalignment of the standard when loads are applied. A rearwardly extending appendage provides a scraper tube mounting which is fixed with respect to the center line of the disk blades regardless of the selected size of the mounting tube.

13 Claims, 2 Drawing Sheets

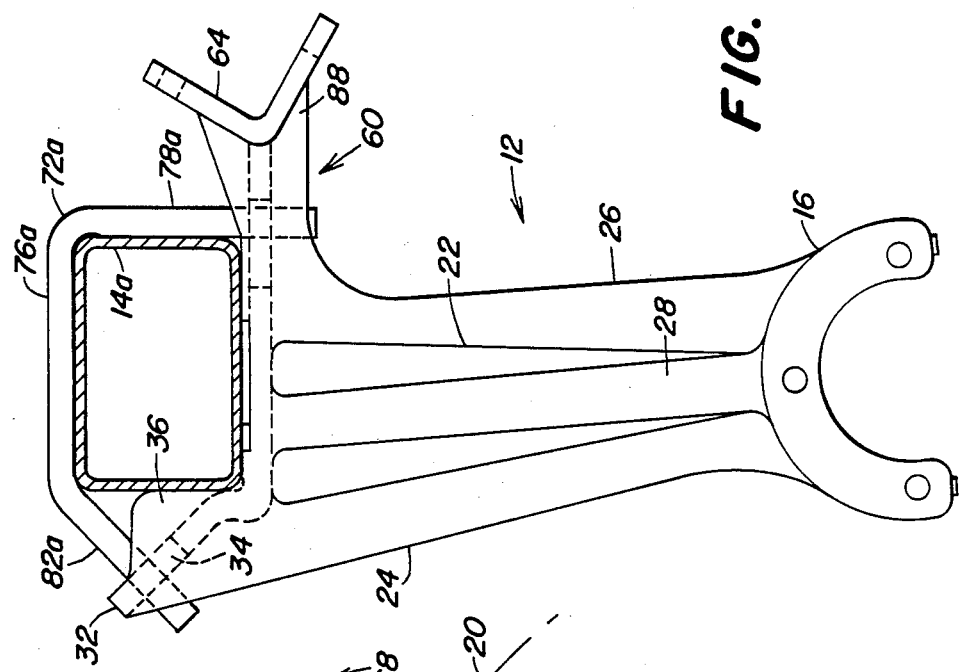
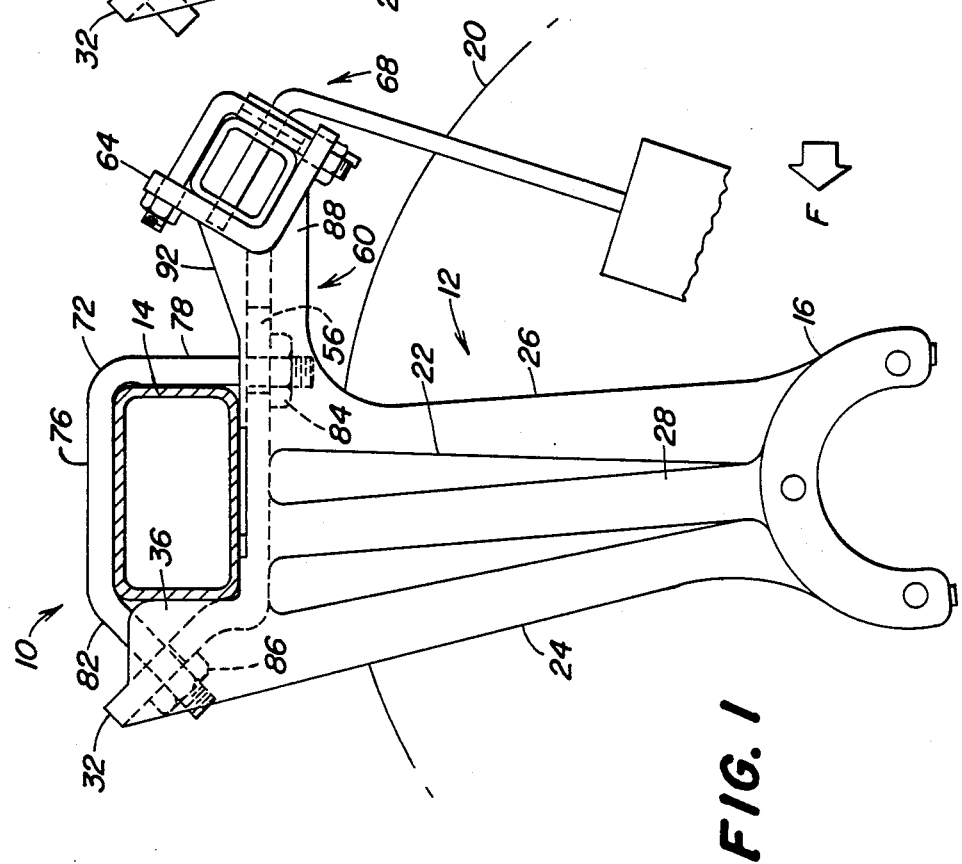

DISK HARROW STANDARD FOR SUPPORT BEAMS OF DIFFERENT CROSS SECTIONS

BACKGROUND OF THE INVENTION

The present invention relates generally to agricultural equipment, and more specifically to a disk harrow bearing standard designed to fit tubes of different cross sections.

Disk harrows are widely used in tillage operations and include gangs of disk blades supported from bearing standards which depend from the harrow frame. Typically, each bearing standard is designed to fit a support tube of unique cross section. As the weight class of the disk is increased or other load requirements are increased which require larger cross section tubes, the bearing standard usually must be changed also. Since the standards are usually either a casting or a welded design, such changes are expensive, even when the only change required is that to the mounting area which attaches to the support tube. In addition, presently available designs have mounting pads to keep the standard from rotating when disking forces are applied from the disk gangs. The mounting pads are necessarily larger than the tube in order to prevent assembly problems. When loads are applied, the standard is free to rotate until the pad is contacted. This rotation allows for misalignment of the standard on the support tube.

Most disk harrows also include gang scrapers mounted to the support tube for cleaning the disks. When the mounting tube sizes change, the parts which mount the scrapers must also be changed to assure that the scrapers are always at a fixed location relative to the disk blade center line. The additional parts and/or mounting holes required for adapting the bearing standard and scraper tube mounting to different tube cross sections increase the cost and complexity of the disk harrow.

BRIEF SUMMARY OF THE INVENTION

It is therefore an object of the present invention to provide an improved disk harrow bearing standard. It is a further object to provide such a standard having an integral scraper mount for supporting scrapers at a fixed location relative to the disk blade center line regardless of the cross section of the support tube.

It is yet another object of the present invention to provide an improved disk harrow bearing standard which may be used with support tubes of differing cross sections. It is a further object to provide such a bearing standard which decreases the manufacturing costs of a disk harrow.

It is still another object of the present invention to provide an improved disk harrow bearing standard which fits support tubes of varying cross sections and yet which is relatively simple in design and which can be tightly clamped against the support tube to prevent any misalignment of the standard when loads are applied.

It is yet a further object of the present invention to provide a bearing standard with a unique design that permits the same standard to be used with support tubes of differing cross sections by simply selecting a U-bolt adapted to the support tube cross section. It is still another object to provide such a structure which includes a scraper tube mount which is fixed in location with respect to the disk blade center line regardless of the selected support tube cross section.

A disk harrow bearing standard constructed in accordance with the teachings of the present invention includes an upright support having a lower bearing-receiving end with mounting structure located at the upper end including a lower surface adapted for contacting the lower face of the support tube and a front locating surface extending perpendicular to the lower surface for contacting the forward face of the support tube. A slotted, bolt-receiving member angles upwardly in the forward direction relative to the front locating member and receives a forty-five degree leg of a specially shaped U-bolt. The U-bolt includes a bight portion connecting the forty-five degree leg to a ninety degree straight leg which extends downwardly through a slot in the lower surface. The U-bolt clamps the standard to the tube in two perpendicular planes which prevents any misalignment of the standard when loads are applied. A rearward facing, L-shaped appendage provides a surface for a scraper tube mounting which is always fixed with respect to the disk blade center line regardless of the tube cross section. The only part change required to mount the standard on a different size of tube is the specific U-bolt designed for the selected tube cross section, and the U-bolt is substantially cheaper to change than a standard casting or weldment.

These and other objects, features and advantages of the present invention will become apparent to those skilled in the art upon reading the following detailed description in view of the drawings.

BRIEF DESCRIPTION OF THE DRAWINGS

FIG. 1 is a side view of a disk harrow bearing standard constructed in accordance with the teachings of the present invention.

FIG. 4 is a view similar to FIG. 1 but showing the standard mounted to a support tube of different cross section.

DESCRIPTION OF THE PREFERRED EMBODIMENT

Figure 3:
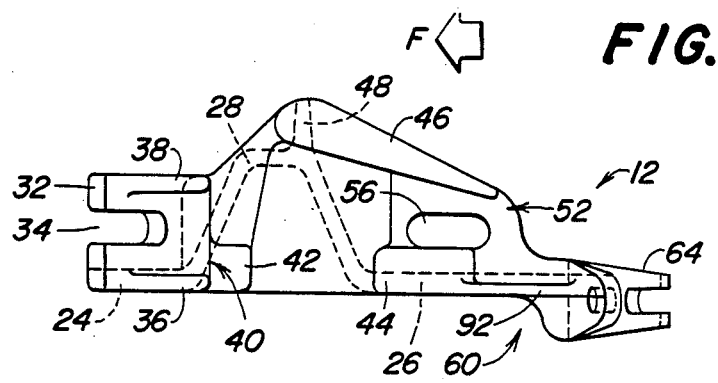
FIG. 3 is a top view of the standard of FIG. 1.
Figure 2:
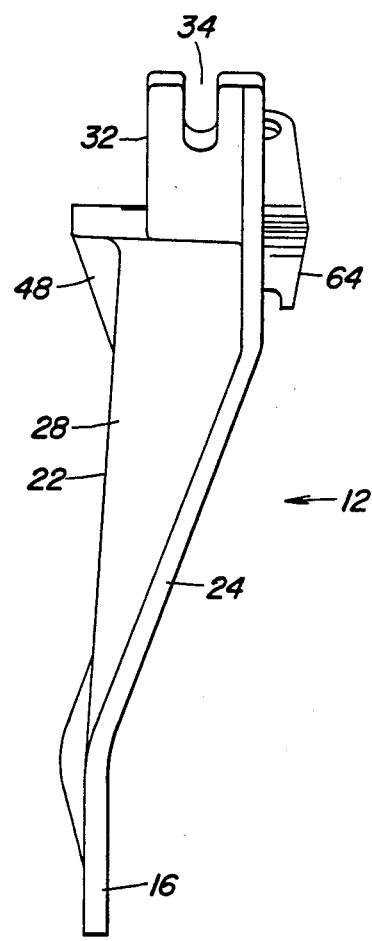
FIG. 2 is a front view of the standard of FIG. 1.

Referring to FIG. 1, there is shown a portion of a disk harrow 10 including a disk harrow bearing standard 12 having an upper end connected to a support tube 14 and a lower bearing-receiving end 16 rotatably mounting a conventional disk gang assembly with disk blades 20 for forward movement (arrow F) over a field.

The bearing standard 12 includes an upright support 22 having fore-and-aft spaced flanges 24 and 26 located on either side of an upwardly diverging channel-shaped portion 28. The front flange 24 extends upwardly to a forward bolt-receiving member 32 which is angled forwardly in the upward direction and includes an upwardly angled, open-ended slot 34 (FIG. 3). Projections 36 and 38 extend upwardly on opposite sides of the slot 34 and terminate along an upright, transverse plane to define a forward locating surface indicated generally at 40 in FIG. 3.

A lower, or upwardly facing, surface extending rearwardly from the lower portion of the bolt-receiving member 32 is defined by first, second and third pads 42, 44 and 46, respectively, with the top surfaces of each of the pads being substantially flat and lying in a horizontally extending plane which is perpendicular to the forward locating surface 40. The pads 42 and 44 are generally aligned in the fore-and-aft direction and have outermost edges which lie generally along the edges of the flanges 24 and 26 (FIG. 3). The third pad 46 is located on the opposite side of the standard and is supported from a brace 48 which extends upwardly from the outermost portion of the channel-shaped portion 28. The pad 46 narrows in the rearward direction and is angled toward the second pad 44. A space indicated generally at 52 is provided between the pads 44 and 46, and a slot 56 elongated in the fore-and-aft direction is provided between the pads. Preferably the standard 12 is cast as a unitary structure with an extension indicated generally at 60 projecting rearwardly from the pads 44 and 46 and defining the area around the slot 56. An L-shaped appendage 64 is supported at the aft end of the extension 60 and carries a disk blade scraping assembly indicated generally at 68 in FIG. 1.

Mounting U-bolts 72 (FIG. 1) and 72a (FIG. 4) are provided for securely mounting the standard 12 on the support tubes 14 and 14a. The U-bolts 72 and 72a are generally identical but the bolt 72a accommodates a larger tube 14a. The U-bolt 72 includes an upper bight portion 76 which has a length substantially equal to the fore-and-aft dimension of the cross section of the tube 14. A rear leg 78 extends downwardly from the bight portion 76 at a ninety degree angle and abuts against the rear face of the tube 14. The lower end of the leg 78 is threaded and extends through the slot 56. A forward leg 82 extends downwardly and forwardly from the bight portion 76 at a forty-five degree angle and includes a threaded end which extends through the upwardly angled slot 34. A nut 84 is threaded onto the end of the leg 78 against the bottom of the bolt-receiving extension 60. A nut 86 is threaded onto the end of the angled leg 82 against the lower portion of the bolt-receiving member 32. As the nut 86 is tightened, the tube 14 will be drawn firmly against the forward locating surface 40, and the lower forward portion of the tube will be clamped tightly between the pad 42 and the front of the bight portion 76. As the nut 84 is tightened, the rear portion of the tube 14 will be drawn tightly between the pads 44 and 46 and the aft end of the bight portion 76. The U-bolt 72 therefore clamps the standard 12 in two planes which are angled at ninety degrees with respect to each other to prevent misalignment of the standard when loads are applied.

By way of example only, the tube 14 shown in FIG. 1 may be a five inch by three inch high tube with the leg 82 of the U-bolt 72 extending through the lowermost portion of the slot 34 and the leg 78 extending through the forwardmost portion of the slot 56. The rear portion of the lower side of the tube 14 rests on the forward portion of the pad 44 with the rear portion of the pad 44, the slot 56 and the pad 46 extending rearwardly beyond the back face of the tube 14. When an identical standard 12 is to be mounted upon a larger tube 14a, for example a six inch by four inch high tube as shown in FIG. 4, a larger U-bolt 76a is provided with the forward leg 82 projecting through the upper portion of the slot 34 and the leg 78a projecting downwardly through the rear portion of the slot 56. With the larger support tube 14a, the rear portion of the bottom face of the tube 14a rests on substantially the entire pad 44. Since the scraper tube mounting 64 is integral with the standard 12, the scraper tube mounting will always be fixed relative to the center line of the disk blade 20 regardless of the size of the selected tube 14 or 14a. The three lower pads 42, 44 and 46 provide a generally triangular support arrangement which firmly seats against the lower face of the tube 14 or 14a. The bolt-receiving extension 60 is strengthened by a flange 88 which is a natural rearward extension of the flange 26. A brace 92 extends upwardly and rearwardly from the pad 44 to the top portion of the L-shaped appendage 64 for added strength.

Having described the preferred embodiment, it will be apparent that modifications can be made without departing from the scope of the invention as defined in the accompanying claims.

We claim:

1. A disk harrow bearing standard adapted for attachment to a selected one of a plurality of support beams of different rectangular cross sections having opposed upper and lower and front and back faces, the standard comprising:
    an upright support having a lower bearing-receiving end and an upper end;
    a mounting structure connected to the upper end of the support, said mounting structure including a lower surface adapted for contacting the lower face of the beam, an upright front locating member adapted for contacting the front face of the beam, a bolt-receiving member angling upwardly in the forward direction relative to the front locating member and including an upwardly inclined opening, a bolt-receiving extension extending rearwardly from the lower surface and including aperture means;
    a U-bolt having a bight portion of length substantially equal to the distance between the front and back faces of the selected support beam, a rear leg extending downwardly from the upper portion and through the aperture means in the extension, and a forward leg extending downwardly and forwardly from the upper portion through the inclined opening;
    means for urging the U-bolt legs through the respective opening and aperture means to draw the rear leg and bight portion tightly against the rear and upper faces, respectively, and the front locating member and lower surface tightly against the front and lower faces, respectively; and
    said aperture means for optionally receiving the U-bolt rear leg in one of at least two alternate positions dependent upon the distance between the faces of the selected beam.

2. The invention as set forth in claim 1 wherein the forward leg extends downwardly from the bight portion substantially perpendicular to the bolt-receiving member, and wherein said inclined opening includes second aperture means for optionally receiving the U-bolt forward leg in one of at least two alternate positions dependent upon the distance between the upper and lower faces of the selected beam.

3. The invention as set forth in claim 2 wherein the bolt-receiving member is angled at approximately forty-five degrees relative to the front locating member.

4. The invention as set forth in claim 1 including a disk scraper support located at the aft end of the bolt-receiving extension at a location fixed with respect to the bearing-receiving end and independent of the cross section of the selected beam.

5. Disk harrow support structure adapted for forward movement including a transverse beam of rectangular cross section having opposed front and back faces and upper and lower sides, a bearing standard having an upright support with a lower bearing-receiving end and an upper end including a lower surface lying generally along a first fore-and-aft extending plane and a locating surface extending upwardly at approximately a ninety degree angle from the lower surface, said upper end also including a first fastener-receiving member angled at an acute angle with respect to the locating surface, a second fastener-receiving member extending from and generally coplanar with the lower surface, and fastener means for securing the lower side and one of the faces of the beam against the lower surface and locating surface, respectively, said fastener means including bolt structure having first and second leg portions connected to the first and second fastener-receiving members, respectively, wherein said second fastener-receiving member includes aperture means for optionally receiving the fastener means in one of at least two alternate positions dependent upon the cross-sectional dimensions of the beam.

6. The invention as set forth in claim 5 wherein the first fastener-receiving member includes an opening and the bolt structure comprises a U-bolt having a first leg extending through and generally perpendicular to the first fastener-receiving member, said first leg extending upwardly from the first fastener-receiving member to a connection with a bight portion extending over the upper side of the beam, and a second leg, said second leg being straight and extending downwardly from the bight portion adjacent the face opposite said one of the faces and through the second fastener-receiving member.

7. The invention as set forth in claim 6 wherein the opening comprises an elongated slot and wherein the bight portion of the U-bolt has a length approximately equal to the distance between the faces, said slot and aperture means optionally receiving U-bolts of differing sizes dependent upon the cross-sectional dimensions of the beam thereby permitting use of the same mounting structure on beams of different cross section.

8. The invention as set forth in claim 5 further including a scraper support connected to the second fastener-receiving member.

9. The invention as set forth in claim 8 wherein the aperture means comprises a slot extending toward the scraper support.

10. The invention as set forth in claim 5 wherein the lower surface comprises three flat pads including a first pad located adjacent the upwardly extending locating surface, a second pad located adjacent the aperture means, and a third pad offset transversely from the first and second pads.

11. The invention as set forth in claim 10 wherein the aperture means comprises a fore-and-aft extending slot.

12. The invention as set forth in claim 10 further including a scraper support projecting from the second pad.

13. The invention as set forth in claim 10 wherein the upright support is channel-shaped and includes a transversely extending brace member supporting the third pad outwardly of the fastener-receiving members.

* * * * *